United States Patent

Peterson, Jr. et al.

(10) Patent No.: US 6,487,488 B1
(45) Date of Patent: Nov. 26, 2002

(54) METHOD OF DETERMINING MAXIMUM SERVICE BRAKE REDUCTION

(75) Inventors: Edmund R. Peterson, Jr., Leesburg, FL (US); Michael J. Hawthorne, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/877,020

(22) Filed: Jun. 11, 2001

(51) Int. Cl.$^7$ .............................................. B60T 15/22
(52) U.S. Cl. .......................... 701/70; 701/19; 303/32; 303/33; 246/182 R; 246/182 A
(58) Field of Search .............................. 701/70, 19, 20; 303/32, 33, 15, 16; 246/182 R, 182 A, 182 B, 182 C, 187 C

(56) References Cited

U.S. PATENT DOCUMENTS

| 4,946,229 | A | * | 8/1990 | Deno et al. ................... 303/33 |
| 5,056,873 | A | * | 10/1991 | Deno et al. ................... 303/33 |
| 5,412,572 | A | * | 5/1995 | Root et al. ............... 246/182 B |
| 5,927,822 | A | * | 7/1999 | Hart ............................... 303/7 |
| 6,144,901 | A | | 11/2000 | Nickles et al. ................ 701/19 |
| 6,219,595 | B1 | * | 4/2001 | Nickles et al. ................ 701/19 |
| 6,227,625 | B1 | * | 5/2001 | Gaughan ..................... 303/15 |
| 6,249,722 | B1 | * | 6/2001 | Balukin et al. ............... 701/19 |

* cited by examiner

*Primary Examiner*—Tan Nguyen
(74) *Attorney, Agent, or Firm*—Barnes & Thornburg

(57) ABSTRACT

A method of and a system for determining a maximum brake pipe service reduction in the brake system of a train having a pneumatic brake on each car connected to a brake pipe which is controlled by a brake pipe controller. The method includes determining the status of the brake system throughout the train and determining a maximum brake pipe reduction for the brake pipe controller, using the status of the brake system, above which further reduction will not result in further brake application in the train. The determined maximum brake pipe reduction is displayed by itself or in combination with the brake pipe reduction produced by the brake pipe controller and/or used for automatic control.

40 Claims, 4 Drawing Sheets

METHOD OF DETERMINING MAXIMUM SERVICE BRAKE REDUCTION

BACKGROUND AND SUMMARY OF THE INVENTION

The present invention relates generally to locomotive display and more specifically to a method of determining maximum service brake reduction and its use with, for example, a Locomotive Engineers Assist Display and Event Recorder (LEADER) system.

The LEADER System, as described in U.S. Pat. No. 6,144,901, is a real-time, enhanced version of the Train Dynamics Analyzer (TDA), a long standing Locomotive Engineer training tool offered by the Train Dynamics Services Group of New York Air Brake. The LEADER system has the ability to display a real-time or "live" representation of a train on the current track, the trackage ahead, the dynamic interaction of the cars and locomotives (both head end and remote), and the current state of the pneumatic brake system. As a tool for the Locomotive Engineer, the LEADER system will allow insight into the effect of throttle changes and brake applications throughout the train providing feedback and information to the Locomotive Engineer not currently available. The information the LEADER system offers provides an opportunity for both safer and more efficient train handling leading to enormous potential economic benefits.

The LEADER System has all the necessary information to predict the future state of the train given a range of future command changes (what if scenarios). With this ability, LEADER can assist the railroads in identifying and implementing a desired operating goal; minimize time to destination, maximize fuel efficiency, minimize in train forces, (etc.) or a weighted combination thereof. LEADER will perform calculations based on the operational goal and the current state of the train to make recommendations to the Locomotive Crew on what operating changes will best achieve these goals.

The TDA functionality was enhanced to assist in training Locomotive Engineer how to better handle their trains. Designs of, simulators with math models are shown in U.S. Pat. Nos. 4,041,283; 4,827,438 and 4,853,883. Further capability was added to investigate accidents by playing the event recorder data through the TDA, monitoring critical physical parameters. Through the years data was collected from instrumented trains and laboratory experiments, allowing the models used by the TDA to be refined. On board data collection for off-loading is shown in U.S. Pat. Nos. 4,561,057 and 4,794,548.

As more Locomotive Engineers became familiar with the TDA display through training sessions, it became apparent that a real time version of the TDA in the cab of a locomotive would offer substantial benefits in improved train handling. Improved train handling would in turn foster safety and economic benefits. Technological limitations prevented the realization of LEADER for a number of years, but modern levels of computer processing power, decreased size of electronics, increase communication capability and increase size and readability of flat panel color displays has made the LEADER system a reality. Earlier designs for on board computer controllers is shown in U.S. Pat. No. 4,042,810 with a description of math models. The LEADER system provides safe and effective control of a train through display or control of the dynamically changing parameters.

The conventional air brakes and air brake systems in conventional freight trains, pneumatic storage reservoir on each freight car, called an auxiliary reservoir is charged by the brake pipe extending throughout the train. The compressor on the locomotive charges the brake pipe through a pressure regulating system. A brake application is achieved, following the charging action, by reducing the pressure in the brake pipe below the level of charge. When the brake pipe pressure is sufficiently reduced, the control valve on each car supplies air from the auxiliary reservoir to the car's brake cylinder. The amount of air supplied is a function of the brake pipe reduction. During an application, if the reduced pressure in the reservoir becomes equal to the increased pressure in the brake cylinder, no further air flow will occur. The pressure is thus equalized and is referred to as equalization pressure. If brake pipe pressure is reduced below the equalization pressure for that individual car, no further brake cylinder pressure is achieved. Brake pipe pressure reduction below the equalization pressure are known as an "over-reduction." This has the effect of wasting compressed air in the brake pipe increasing the time required to recharge the train brake system and release the brakes by the recharging. In actual freight operations, the brake pipe pressure that exists at each car may vary significantly with time and car location. It may take a very few minutes to charge the first car in a train to regulation level. It may take up to an hour or longer to charge the last car.

It is impossible for a locomotive engineer to calculate and keep track of the maximum reduction that can be made during brake applications. Thus the engineer can easily produce an over reduction wasting compressed air and increased time required to release and recharge the train brake system. This can result in a dangerous situation as often times a quick release and then recovery of the brake application is required to properly control the train. Thus there is a need for a system to inform the engineer when all cars have come to their equalization pressure and will achieve no additional braking for a further reduction of the brake pipe.

The present invention provides a method of determining the maximum brake pipe reduction including the steps of determining the status of the brake system throughout the train. The next step is determining, using the status of the brake system, maximum brake pipe reduction above which further reduction will not result in further brake application in the train. The determined maximum brake pipe reduction may be displayed or used to control the brake pipe. The status of the brake system throughout the train is determined by determining equalization pressure of the brake system in each car. This may be by a mathematical models or actual measurements. The equalization pressures are a function of pressures and volumes of the reservoir and brake cylinder of the individual cars.

The process can also include determining the minimum determined car equalization pressure throughout the train and determining the maximum brake reduction using the minimum determined car equalization pressure. If the minimum car equalization pressure for the train is greater than a first pressure value, the minimum equalization pressure is used to determine the maximum brake pipe reduction. If the minimum car equalization pressure is less than the first pressure value, the first pressure value is used in determining the maximum brake pipe reduction. The first pressure value is generally set to a minimum pressure required for an emergency operation of the brake system. Preferably the method is repeated after each brake pipe pressure increase. Recalculation is necessary because it changes the original dynamics and calculation of equalization pressure for each car.

Other objects, advantages and novel features of the present invention will become apparent from the following detailed description of the invention when considered in conjunction with the accompanying drawings.

DETAILED DESCRIPTION OF THE PREFERRED EMBODIMENTS

Math models of the LEADER System, monitors parameters and performs calculations based on the current energy state of the train to create a real-time display of train dynamics. The power of LEADER resides in its ability to provide information allowing the crew to better control the train, minimizing loss of energy. Loss of energy via overbraking represents fuel unnecessarily consumed. Energy imparted to the cargo of the train represents potential damage to lading, equipment and rail. Both phenomena are undesirable and addressable with LEADER.

Figure 1:
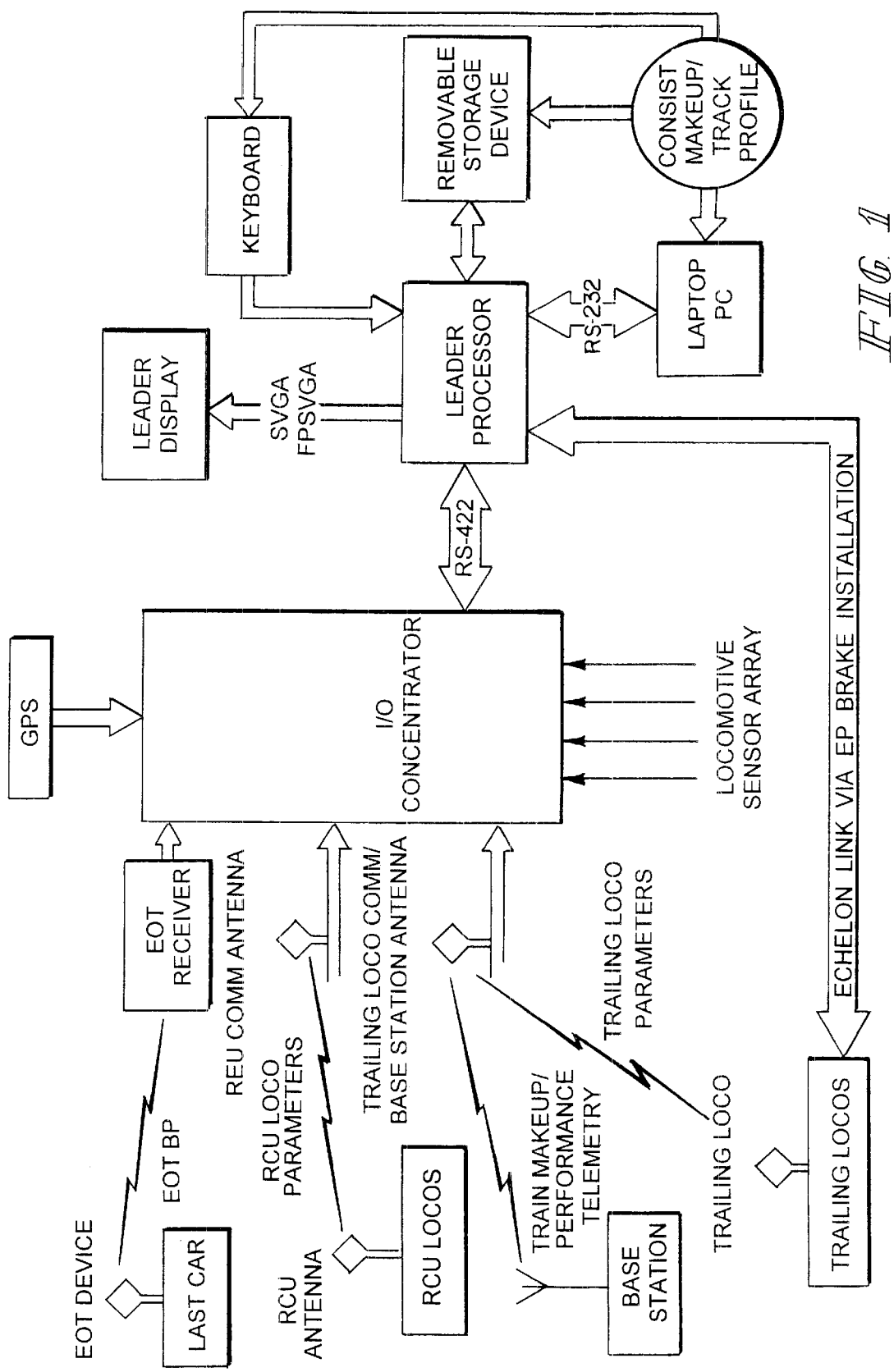
FIG. 1 is a block diagram of the system components of a locomotive assist display and event recorder system according to the principles of the present invention.
Figure 2:
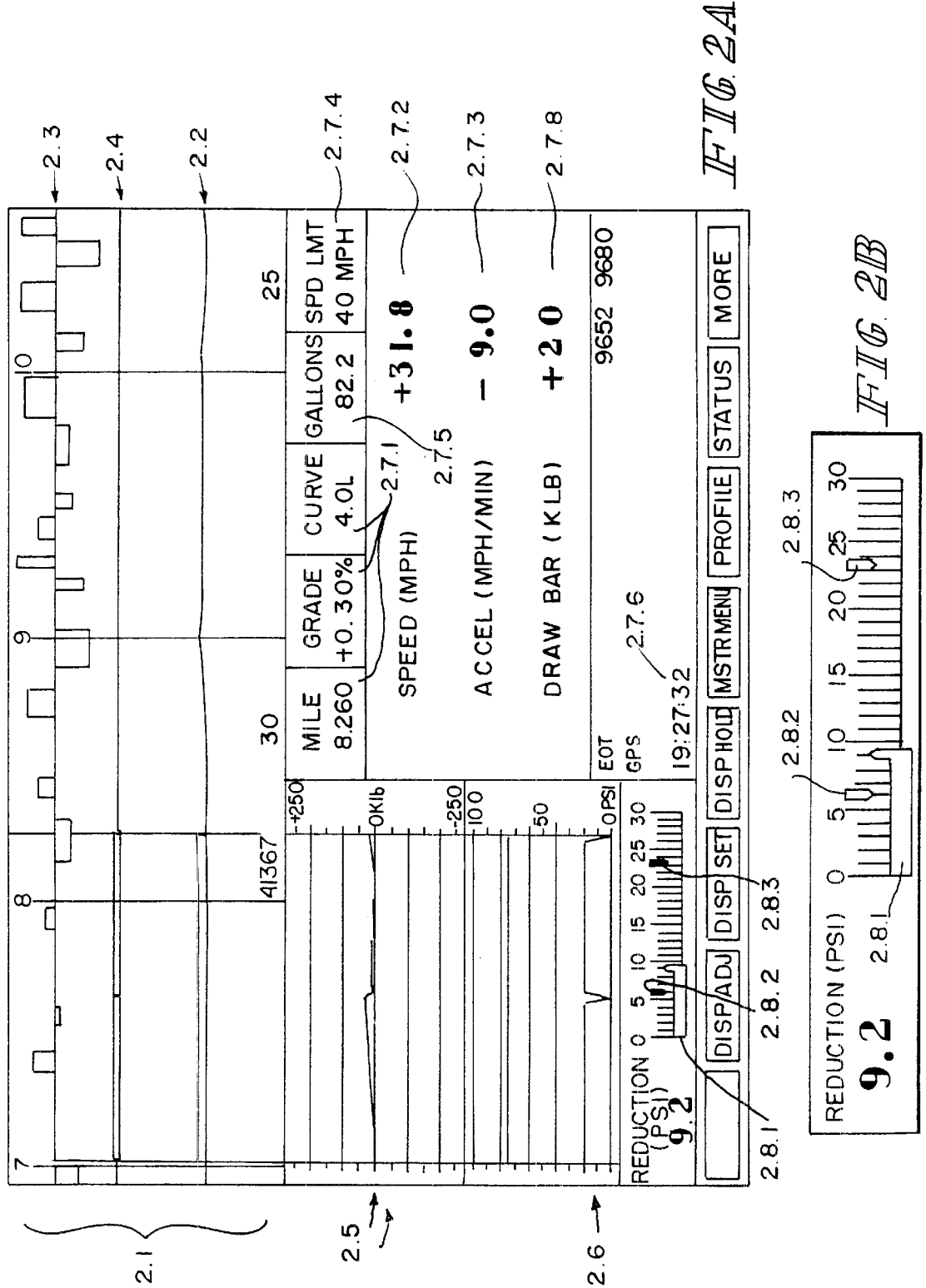
FIGS. 2A and 2B are a LEADER display incorporating the principles of the present invention.

The LEADER system is comprised of a number of subsystems each with specific duties. FIG. 1 shows a generic LEADER architecture. The user interface of the LEADER System is the real-time display which shows a graphical and numerical representation of the current state of the train as shown in FIGS. 2A and 2B. Radio communication is established between the lead locomotive, the trailing locomotives in the lead consist, and locomotives in the remote consist to report the necessary parameters from each of these locomotives necessary to perform LEADER Calculations. Consist information is entered via the key pad on the real-time display, a wired communication source (laptop PC or removable storage device) or via wayside radio communication. Position is determined from wheel movement sensors and a Global Positioning System (GPS). The Input/Output (I/O) Concentrator gathers all of the various locomotive parameters necessary for LEADER algorithm calculations and reports the information to the LEADER Computer. The LEADER Processor, a high throughput capacity computer platform using a Real Time Operating System (RTOS), then performs the calculations required by the LEADER algorithms and the real-time display is updated. All of these sub-systems combine to form the LEADER System.

Each locomotive in a LEADER train will require at a minimum, the I/O Concentrator with communication capability to the head end. A LEADER Processor and Display are only required for the lead locomotive. The decision to equip all locomotives with a full LEADER installation (Processor, Display in addition to the I/O Concentrator) should be based on the Railroads ability to permanently designate a locomotive as lead or trail in its duties.

The development of LEADER began over 20 years ago with early efforts to create the Train Dynamics Analyzer (TDA), a computer math model used to predict in-train forces. The train dynamic modeling techniques and algorithms embodied in the TDA are described in U.S. Pat. No. 4,041,283. A more detailed description of the LEADER system is found in U.S. Pat. No. 6,144,901.

FIGS. 2A and 2B show a "static" LEADER display. Each LEADER feature is identified by a block which points to the appropriate screen location. The sections following use the same paragraph number as the identification block detail the operation of each feature.

The LEADER Display shown in FIG. 2A and 2B represents one particular configuration for the display of LEADER information. The display format can be customized on customer request by adding. information, removing information, changing the color scheme, rearranging the position of the sections of information, and/or varying the size of any particular graphic.

In the following descriptions of features on the LEADER Display the term function will be used to describe the plot of the magnitude of a particular parameter across the length of the train varying with time. Sections are numbered to match the identification blocks of FIG. 2.

2.1 Track Profile

The top portion of the LEADER Display shows the track profile in three views. The train consist is represented with different colored blocks for the locomotive units and for the cars. The length of the displayed train is proportional to the length of the actual train. Milepost marks are represented by lines running vertically through the track profile portion of the display.

2.2 Horizontal View of Track

The horizontal view of the track profile shows the grade on which the train is currently positioned and the grade of the track profile for a number of miles ahead. The horizontal view of the track profile will show the position of the entire train on the track, both current location and geographic shape (uphill or downhill) as a vertical slice of the track profile in real-time.

2.3 Track Curvature Representation

The top graphic of the track profile section is made up of blocks that represent track curvature. A block above the dividing line represents a curve to the right, a block below the dividing line represents a curve to the left. The longer the block the longer the curve. The higher the block the more severe the curve.

2.4 Overhead View/Supplemental Information

Just above the horizontal view is the overhead view. This view incorporates symbols to represent track structures such as crossings, signals, overpasses, underpasses, and sidings.

2.5 In-Train Forces

Directly below the train represented on the LEADER display is the portion of the screen dedicated to showing in-train forces. All in-train forces are displayed as a graphic that maps to each car in the train. Follow any point on any of the force functions straight up the display and it will intersect with a point on the train where that particular level of force is currently present. The graphics can be identified as the draft/buff magnitude force functions.

The draft/buff force graphic represents draft forces as a function above the 0 kilo-pound line and buff forces as a function below the 0 kilo-pound line. Draft and buff forces can be divided into two categories, steady state and transient. Steady state forces are shown, in general, by a smooth, relatively slow changing function. Transient draft and buff forces (run-in/run-out or slack induced forces) are shown by "spikes" of force that travel through the train. The LEADER system accurately calculates and displays both. Slack induced forces represent momentum transfers between the cars resulting in potential lading and car damage.

2.6 Brake Cylinder Pressure

Directly below the force graphics is a function that represent brake cylinder pressure throughout the train. Again, these functions map to a location in the train representation directly above. Because the functions are real-time representations of the brake system, it is possible to monitor a brake application or release as it travels through the entire train.

2.7 Trajectory/Telemetry Information

The lower right and lower center sections of the screen have real time trajectory and status information displayed in digital format.

2.7.1 Head End Information

Location is a digital representation of mile marker location of the head end locomotive. Grade is the grade of the track at the location of the head end locomotive. Curve is the degree of curvature of the track at the location of the head end locomotive.

2.7.2 Speed is shown as a digital read out of the speed of the head end locomotive at each instant in time.

2.7.3 Acceleration is shown as a digital read out representing the acceleration of the head end locomotive at each instant in time.

2.7.4 Current Speed Limit is shown as a digital read out of the speed limit for the current position of the head end locomotive.

2.7.5 Fuel is the amount of fuel consumed since the counter was last reset.

2.7.6 Time is the digital read out of the current time.

2.7.7 Brake Pipe Reduction (or EP Brake Command) This graphic takes on two roles; one for conventional pneumatic brake equipped trains and one for EP Brake equipped trains. In Conventional, the graphic is a digital read out followed by an analog bar graph 2.8.1 representing the brake pipe pressure reduction at the head end locomotive at each instant in time. The LEADER system has the capability to support trains equipped with EP Brake Systems rather than conventional displacement valves. In an EP equipped train the graphic is a digital read out followed by an analog bar graph representing the percent of brake commanded to the EP System.

2.7.8 Draw Bar Forces is a digital read out followed by an analog bar graph representing the instantaneous locomotive draw bar force of the last locomotive of the lead consist.

2.8.1 Pneumatic Brake Reduction is shown as an analog bar graph representing the brake pipe pressure reduction at the head end locomotive at each instant in time.

2.8.2 Minimum Safe Pneumatic Brake Reduction is of interest for safe train operation. As brake applications are applied and released the charge state of the pneumatic brake system can become such that an undesired release of brakes will occur if the next brake application requested is not deep enough. The LEADER system will calculate the safe brake application level and visually display a minimum target on the Brake Reduction bar graph. If the brake application requested is not deep enough, a visual warning will be posted by the LEADER display. This is described in detail in U.S. Pat. No. application Ser. No. 09/152,244 filed Sep. 11, 1998.

2.8.3 Maximum Pneumatic Brake Reduction is of interest for safe train operation. As the auxiliary reservoir reaches the equalization pressure for its brake cylinder, further reduction of the brake pipe will not produce any additional braking on that car. Once all the car's auxiliary reservoirs have reached their equalization pressure, further reduction of the brake pipe will produce no additional braking on the train. Further reduction will only waste brake pipe pressure.

The LEADER system will calculate a maximum safe brake pipe reduction and visually displays if on the brake pipe reduction bar graph. If the brake pipe request is greater than the maximum target, visual warning will be posted by the LEADER display.

The LEADER display is equipped with eight function keys at the bottom of the display. The definition of each function key is shown in the representation of the key on the LCD panel directly above it. The function keys allow user input to the system, accessing various setup and configuration menus and querying information from the LEADER system.

The LEADER system is capable of three operating modes, each building on the previous mode. The three modes advance the LEADER system from a real time display passively providing information to the locomotive engineer (information only mode) to a LEADER system that will make suggestions to the locomotive engineer on how to better handle the train (driver assist mode) and finally to a control system that is capable of issuing commands to optimally control the locomotive (cruse control mode).

In the information only mode, the locomotive engineer makes all of the decisions and solely activates the various-control systems in a manual mode. The LEADER system provides information to the engineer that is not currently available to him/her to use to manage various locomotive control systems. In driver assist mode, the LEADER system determines and displays the optimum locomotive power dynamic brake throttle setting and the locomotive and car brake control settings. These settings are determined for the head end locomotives and the remotely controlled locomotives. These recommendations are desired settings displayed to the locomotive engineer who can then elect to manually move the various controls to achieve these settings. In the cruise control mode, LEADER derived settings are used to automatically control the locomotive power and braking systems, the train brake system of each car and ancillary systems which effect train movement. The locomotive engineer serves as an operational-supervisor with the ability to manually override the cruise control. Cruise control can also be produced by communication links between the LEADER and the railroad central traffic control center.

Figure 3:
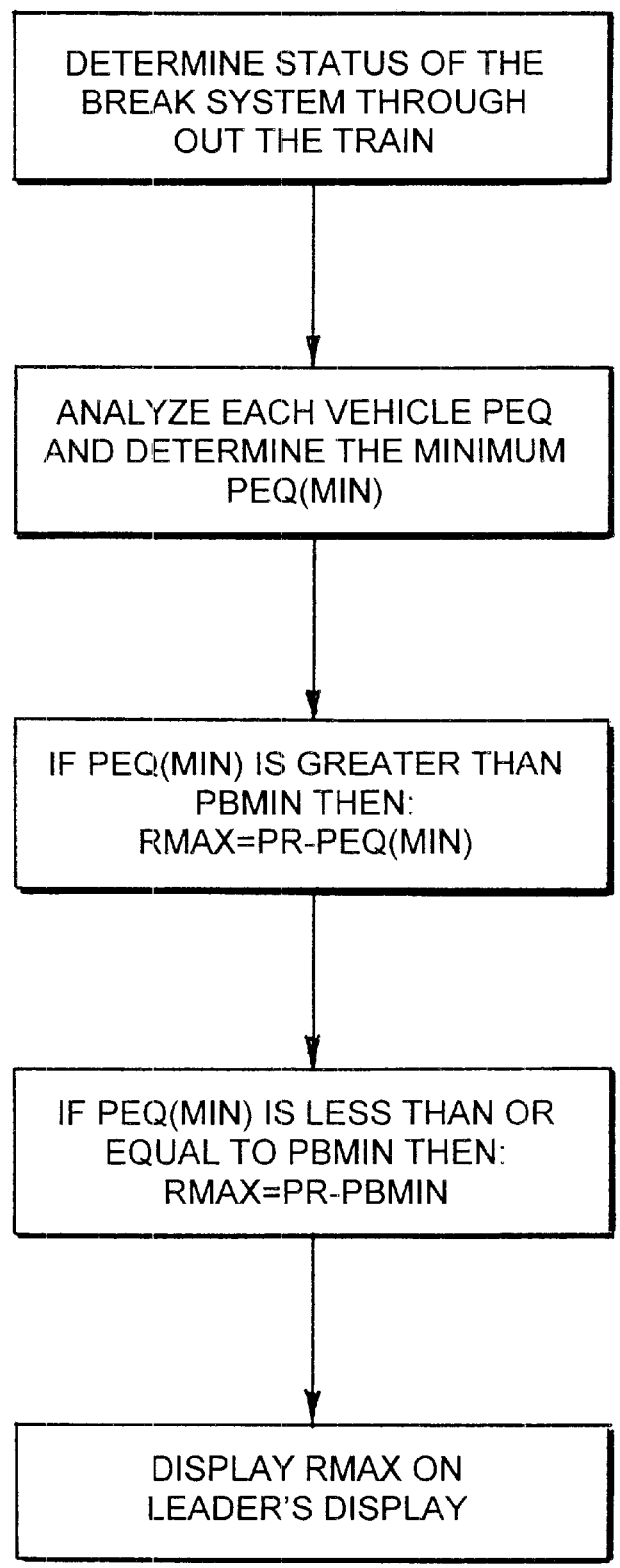
FIG. 3 is a flow chart of a first embodiment of a method for determining maximum service brake reduction according to the principles of the present invention.
Figure 4:
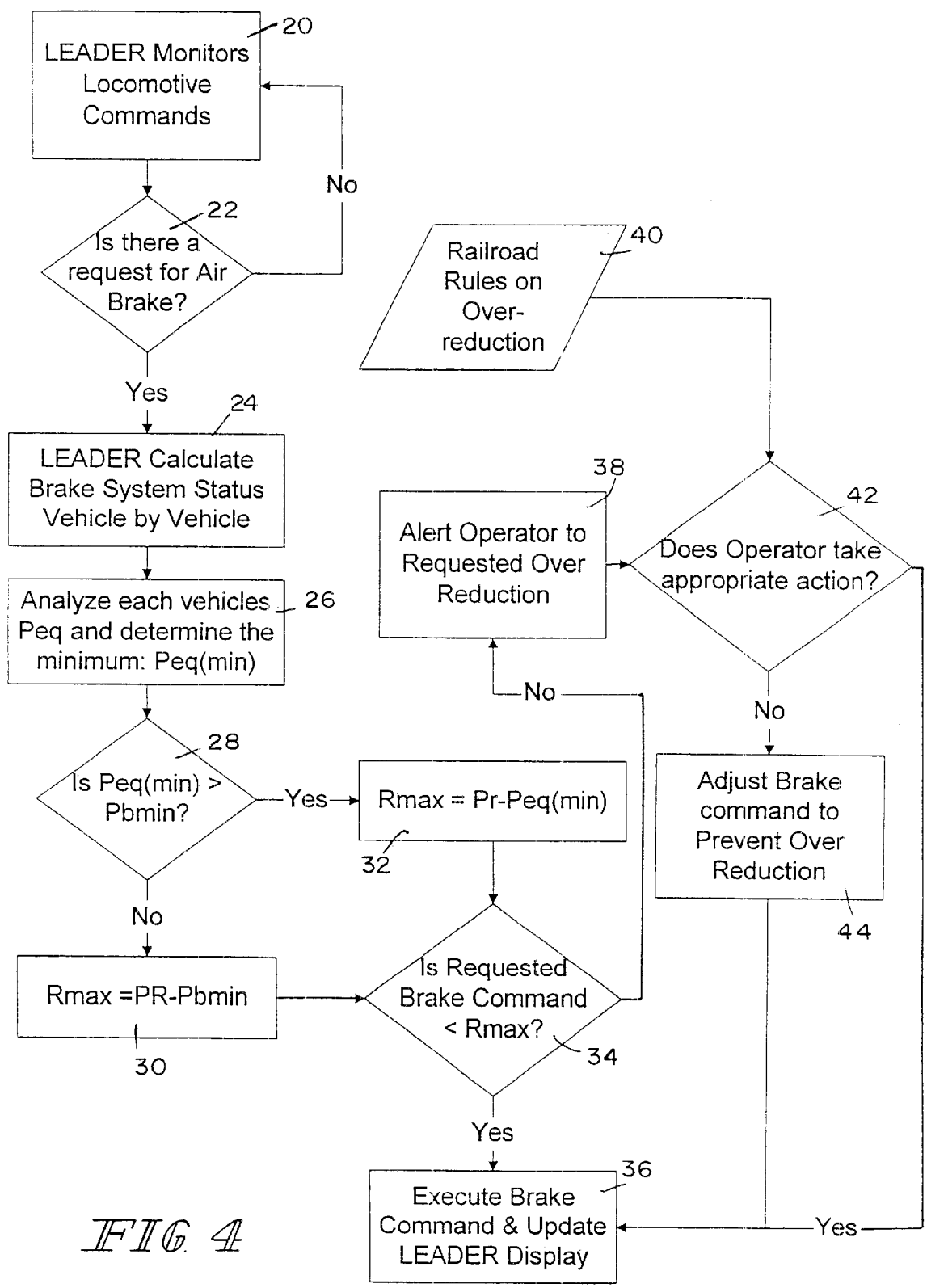
FIG. 4 is a flow chart of a second embodiment of a method for determining maximum service brake reduction with enforcement according to the principles of the present invention.

The LEADER system provides a maximum brake reduction using, for example, the flow charts of FIGS. 3 or 4. As illustrated in the flow chart of FIG. 3, the state of the brake system throughout the train is determined from the LEADER algorithms at 10. LEADER inputs are collected. For example, it measures the locomotive brake control settings or determined brake requirement, the brake pipe pressures and the time. The brake pipe pressures may be measured at each locomotive and the end-of-train device or any other sensor or smart node throughout the train. Any additional measurement is used to increase the accuracy of the math model for the pressure in the train brake system. The data base of the train make up including car weights and lengths, brake equipment definition and coupler types etc. is also used.

The status of the brake pipe system throughout the train is determined on a vehicle by vehicle basis using brake simulation models by themselves or in combination with multiple measurements throughout the train. Depending upon the intelligence levels of the individual cars, more information can be collected to increase the accuracy of the simulation models.

An analysis of each car's equalization pressure and the minimum equalization pressure for the train is determined. The equalization pressure is the pressure at which the brake cylinder and the reservoir pressure, which applies air to the brake cylinder, for example, auxiliary reservoir pressure, have equalized. The equalization pressure can be determined by the following formula: (Boyle's Law):

$$Peq=(Pa*Va+Pc*Vc)/(Va+Vc)$$

Where:
Peq=Equalization pressure
Pa=Auxiliary pressure
Pc=Brake cylinder pressure
Va=Auxiliary Reservoir volume
Vc=Brake Cylinder volume For example:
IF:
Pa=70 psi
PC=0 psi
Va=2500 cu. in.
Vc=1000 cu. in.
THEN:
Peq=50 psi Next the maximum brake pipe reduction Rmax is determined at 14 or 16. A locomotive engineer controls the extent of brake application by reducing the brake (brake pipe reduction) pipe pressure that causes the auxiliary pressure at each freight car to correspondingly reduce to the same approximate level. The auxiliary pressure is reduced through a flow of air to the brake cylinder. The locomotive engineer controls the pressure level that a train is charged to. The brake pipe regulation pressure typically ranges from 70 psi to 110 psi. The difference between the regulation pressure that the train is charged to and the brake pipe pressure that the brake pipe is reduced to, during a brake application, is the amount of brake pipe reduction. The amount of reduction is calculated as follows:

$$R=Pr-Pb$$

Where:
R=Brake pipe reduction
Pr=Brake pipe regulation pressure
Pb=Current brake pipe level If the brake pipe pressure is reduced below the equalization pressures Peq no further brake cylinder pressure is achieved. Brake pipe pressure reductions R lower than equalization pressure Peq is an "over reduction", and has the effect of wasting compressed air and increasing the time required to release and recharge the train brake system. The maximum reduction that should be made can be computed as follows:

$$Rmax=Pr-Peq$$

Freight trains have an emergency application, braking mode which guarantees that the train can be stopped as quickly as possible. This emergency feature will not reliably operate at brake pipe pressures below 35 to 45 psi. The maximum brake reduction should thus be computed as:

$$Rmax=Pr-Peq(min) \text{ (if Peq>Pbmin)}$$

$$Rmax=Pr-Pbmin \text{ (if Peq<Pbmin)}$$

Where:
Rmax=recommended maximum reduction
Pbmin=lowest brake pipe pressure for emergency to operate
Peq(min)=minimum equalization pressure in the brake system In actual freight operations, the brake pipe pressure that exists at each car may vary significantly with time and car location. It may take a very few minutes to charge the first car in a train to regulation level but may take up to an hour or longer to charge the last car.

It is impossible for a locomotive engineer to calculate and keep track of the maximum reduction that he should make during brake applications. The LEADER computer keeps track of the state of brake pipe and reservoir charge pressures from car to car on a continuous basis. The resultant Rmax is then reported at 18 continuously to the engineer in a graphical fashion on the LEADER display as shown in FIG. 2B.

FIG. 4 illustrates a flow chart for enforcement of the maximum brake pipe reduction. It can also be used for cruise or automatic control. The LEADER system monitors locomotive brake commands at 20. If there is a brake command at 22, then the LEADER system calculates brake system status, vehicle by vehicle as illustrated in 24. If there is no brake command, it cycles back to monitoring locomotive commands at 20. Next there is analysis of each vehicles equalization pressure Peq and a determination of the minimum equalization pressure through the train Peq(min). If the minimum brake equalization pressure Peq(min) is greater than the lowest brake type pressure for emergency to operate Pbmin as determined at 28, then the maximum brake pipe reduction Rmax is equal to the difference of the brake pipe regulation pressure Pr and the minimum equalization pressure Peq(min) at 32. If the minimum equalization pressure Peq(min) is equal to or less than the Pbmin at 28, then the maximum reduction pressure Rmax is the regulation pressure Pr less the lowest brake pipe pressure for emergency to operate Pbmin.

In addition to displaying the maximum reduction Rmax as 2.8.3 in FIG. 2B, it is determined whether the requested brake command is less than the maximum reduction Rmax at 34. If it is, the requested brake command is executed and the LEADER display is updated at 36. If the requested brake command is not less than the maximum brake pipe reduction Rmax at 34, the operator is alerted to the requested over reduction at 38. This may be an audio or visual indication. After the alert, it is determined at 42 whether the operator took appropriate action based on the railroad rules and over reduction at 40. If the appropriate action is taken, the appropriate brake reduction is executed and the LEADER display is updated at 36. If not, the system automatically adjusts the brake pipe command to prevent over reduction at 44 and this adjusted brake command is executed and the displays updated at 36.

The present method has been carried out wherein the minimum equalization pressure throughout the brake system or the car having the minimum equalization pressure is used since this provides additional breaking even though it may be one car. The railroad may set other rules for determining the minimum equalization pressure throughout the train in determining the maximum reduction.

Since the process of FIGS. 3 and 4 are continuously performed, the equalization pressure of each car and the brake pipe values are continuously updated. This will account for any release of brakes, subsequent to any braking action. With the release of brakes, the brake cylinder pressure is reduced to atmosphere and the auxiliary pressure is recharged. This will change the equalization pressure for each of the cars. Also with the rate of charging the brake pipe, at any point in time each car may have a different value and consequently its equalization pressure. It should also be noted that the LEADER model takes into effect variations in brake pipe pressure throughout the train due to reduction for braking or charging for release.

Although the present invention has been described and illustrated in detail, it is to be clearly understood that the same is by way of illustration and example only, and is not to be taken by way of limitation. The spirit and scope of the present invention are to be limited only by the terms of the appended claims.

In the claims:

1. A method of determining maximum brake pipe reduction in a brake system of a train having a pneumatic brake on each car connected to a train brake pipe which is controlled by a brake pipe controller, the method comprising:
   determining status of the pneumatic brake on the cars through out the train; and
   determining, using the status of the pneumatic brakes, a maximum brake pipe reduction for the brake pipe controller above which further reduction will not result in further brake application in the train.

2. A method according to claim 1, including displaying the determined maximum brake pipe reduction.

3. A method according to claim 1, wherein determining the status includes determining equalization pressure of the pneumatic brake at each car.

4. A method according to claim 3, wherein determining the equalization pressure for each car is determined as a function of the pressures and volumes of a reservoir and a brake cylinder of each car.

5. A method according to claim 3, wherein determining the maximum brake pipe reduction includes determining the minimum determined car equalization pressure in the brake system, and determining the maximum brake pipe reduction for the brake pipe controller using the minimum determined car equalization pressure.

6. A method according to claim 1, wherein determining the status includes determining equalization pressure of the pneumatic brake at each car; and determining the maximum brake pipe reduction includes determining the minimum determined car equalization pressure in the brake system and using the minimum determined car equalization pressure and brake pipe regulation pressure.

7. A method according to claim 1, wherein determining the status includes determining a minimum equalization pressure of the brake system; and the maximum brake pipe reduction is determined using the minimum car equalization pressure.

8. A method according to claim 7, wherein the maximum brake pipe reduction is determined using the minimum car equalization pressure if the minimum car equalization pressure is greater than a pressure value and using the pressure if the minimum car equalization pressure is less than the pressure value.

9. A method according to claim 8, wherein the pressure value is set to a minimum pressure value required for emergency operation of the braking system.

10. A method according to claim 1, including determining a requested brake pipe reduction; and indicating if the requested brake pipe reduction is more than the determined maximum brake pipe reduction.

11. A method according to claim 1, including determining a requested brake pipe reduction; and displaying the determined maximum brake pipe reduction if the requested brake pipe reduction is greater than the determined maximum brake pipe reduction and displaying the requested brake pipe reduction if the requested brake pipe reduction is less than the determined maximum brake pipe reduction.

12. A method according to claim 10, including controlling the brake pipe controller to the displayed brake pipe reduction.

13. A method according to claim 1, including determining a requested brake pipe reduction; and controlling the brake pipe controller to the determined maximum brake pipe reduction if the requested brake pipe reduction is greater than the determined maximum brake pipe reduction and controlling the brake pipe controller to the requested brake pipe reduction if the requested brake pipe reduction is less than the determined maximum brake pipe reduction.

14. A method according to claim 1, wherein the brake pipe controller is in a locomotive of the train and the method is performed on a computer in the locomotive.

15. A method according to claim 1, wherein the status of the brake system is determined using train brake system modeling.

16. A method according to claim 1, wherein determining the status of the pneumatic brakes includes each car reporting the status of the brake system of the car.

17. A method according to claim 1, wherein determining the status of the pneumatic brakes includes determining brake cylinder pressure and at least one of reservoir or brake pipe pressure for each car.

18. A method according to claim 1, wherein the method is repeated at least after each brake pipe pressure increase.

19. A method of determining maximum brake pipe reduction in a brake system of a train having a pneumatic brake on each car connected to a train brake pipe which is controlled by a brake pipe controller, the method comprising:
   determining equalization pressure of the brake system at each car;
   determining the minimum determined car equalization pressure in the brake system; and
   determining, using the minimum determined car equalization pressure, a maximum brake pipe reduction for the brake pipe controller above which further reduction will not result in further brake application in the train.

20. A method according to claim 19, wherein determining the equalization pressure for each car is determined as a function of the pressures and volumes of a reservoir and a brake cylinder of each car.

21. A method according to claim 19, wherein the maximum brake pipe reduction is determined using the minimum car equalization pressure if the minimum car equalization pressure is greater than a pressure value and using the pressure if the minimum car equalization pressure is less than the pressure value.

22. A method according to claim 19, including displaying the determined maximum brake pipe reduction.

23. A method according to claim 19, including determining a requested brake pipe reduction; and indicating if the requested brake pipe reduction is more than the determined maximum brake pipe reduction.

24. A method according to claim 19, including determining a requested brake pipe reduction; and displaying the determined maximum brake pipe reduction if the requested brake pipe reduction is greater than the determined maximum brake pipe reduction and displaying the requested brake pipe reduction if the requested brake pipe reduction is less than the determined maximum brake pipe reduction.

25. A method according to claim 19, including determining a requested brake pipe reduction; and controlling the brake pipe controller to the determined maximum brake pipe reduction if the requested brake pipe reduction is greater than the determined maximum brake pipe reduction and controlling the brake pipe controller to the requested brake pipe reduction if the requested brake pipe reduction is less than the determined maximum brake pipe reduction.

26. A method of determining maximum brake pipe reduction in a brake system of a train having a pneumatic brake on each car connected to a train brake pipe which is controlled by a brake pipe controller, the method comprising:

determining a minimum car equalization pressure of the brake system;

determining a maximum brake pipe reduction using the minimum car equalization pressure if the minimum car equalization pressure is greater than a pressure value and using the pressure if the minimum car equalization pressure is less than the pressure value.

27. A method according to claim 26, including displaying the determined maximum brake pipe reduction.

28. A method of determining maximum brake pipe reduction in a brake system of a train having a pneumatic brake on each car connected to a train brake pipe which is controlled by a brake pipe controller, the method comprising:

determining a minimum car equalization pressure of the brake system;

determining, using the minimum determined car equalization pressure, a maximum brake pipe reduction for the brake pipe controller;

determining a requested brake pipe reduction; and indicating if the requested brake pipe reduction is more than the determined maximum brake pipe reduction.

29. A method of displaying maximum brake pipe reduction in a brake system of a train having a pneumatic brake on each car connected to a train brake pipe which is controlled by a brake pipe controller, the method comprising:

determining a minimum car equalization pressure of the brake system;

determining, using the minimum determined car equalization pressure, a maximum brake pipe reduction for the brake pipe controller;

determining a requested brake pipe reduction; and displaying the determined maximum brake pipe reduction if the requested brake pipe reduction is greater than the determined maximum brake pipe reduction and displaying the requested brake pipe reduction if the requested brake pipe reduction is less than the determined maximum brake pipe reduction.

30. A method of controlling maximum brake pipe reduction in a brake system of a train having a pneumatic brake on each car connected to a train brake pipe which is controlled by a brake pipe controller, the method comprising:

determining a minimum car equalization pressure of the brake system;

determining, using the minimum determined car equalization pressure, a maximum brake pipe reduction for the brake pipe controller;

determining a requested brake pipe reduction; and controlling the brake pipe controller to the determined maximum brake pipe reduction if the requested brake pipe reduction is greater than the determined maximum brake pipe reduction and controlling the brake pipe controller to the requested brake pipe reduction if the requested brake pipe reduction is less than the determined maximum brake pipe reduction.

31. A locomotive display system for a train including a brake system having a pneumatic brake on each car connected to a train brake pipe which is controlled by a brake pipe controller, the display system comprising:

a display of brake pipe reduction at the locomotive; and a display of a maximum brake pipe reduction above which further reduction will not result in further brake application in the train.

32. A system according to claim 31, wherein the brake pipe reduction is an analog display and the maximum brake pipe reduction is an indication on the analog display.

33. A system according to claim 32, wherein the brake pipe reduction is also digitally displayed.

34. A system according to claim 31, including means for determining the maximum brake pipe reduction using the brake system status throughout the train.

35. A system according to claim 31, including means for determining a minimum equalization pressure in the brake system and determining the maximum brake pipe reduction using the determined minimum equalization pressure.

36. A system according to claim 35, wherein the means determines the maximum brake pipe reduction using the minimum car equalization pressure if the minimum car equalization pressure is greater than a pressure value and using the pressure if the minimum car equalization pressure is less than the pressure value.

37. A system according to claim 31, including means for determining the equalization pressure of each car in the train, determining a minimum determined equalization pressure in the brake system, and determining the maximum brake pipe reduction using the determined minimum determined equalization pressure.

38. A system according to claim 31, including means for determining a requested brake pipe reduction and controlling the brake pipe controller to the determined maximum brake pipe reduction if the requested brake pipe reduction is greater than the determined maximum brake pipe reduction and controlling the brake pipe controller to the requested brake pipe reduction if the requested brake pipe reduction is less than the determined maximum brake pipe reduction.

39. A locomotive control system for a train including a brake system having a pneumatic brake on each car connected to a train brake pipe which is controlled by a brake pipe controller, the system comprising:

means for determining a minimum car equalization pressure of the brake system;

means for determining, using the minimum determined car equalization pressure, a maximum brake pipe reduction for the brake pipe controller;

means for determining a requested brake pipe reduction; and means for controlling the brake pipe controller to the determined maximum brake pipe reduction if the requested brake pipe reduction is greater than the determined maximum brake pipe reduction and controlling the brake pipe controller to the requested brake pipe reduction if the requested brake pipe reduction is less than the determined maximum brake pipe reduction.

40. A system according to claim 39, wherein the means for determining a maximum brake pipe reduction uses the minimum car equalization pressure if the minimum car equalization pressure is greater than a pressure value and uses the pressure if the minimum car equalization pressure is less than the pressure value.

* * * * *